US010362527B2

(12) United States Patent
Carames et al.

(10) Patent No.: US 10,362,527 B2
(45) Date of Patent: Jul. 23, 2019

(54) SELECTIVELY PROVIDING ACCESS TO NETWORK SERVICES BASED ON FREQUENCY BAND INFORMATION

(71) Applicant: Verizon Patent and Licensing Inc., Arlington, VA (US)

(72) Inventors: Miguel A. Carames, Argyle, TX (US); Jignesh Patel, Haltom City, TX (US); Maria E. Palamara, Denville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 15/269,531

(22) Filed: Sep. 19, 2016

(65) Prior Publication Data

US 2018/0084468 A1    Mar. 22, 2018

(51) Int. Cl.
*H04W 36/08* (2009.01)
*H04W 48/02* (2009.01)
*H04W 88/02* (2009.01)
*H04W 48/18* (2009.01)

(52) U.S. Cl.
CPC ............ *H04W 48/02* (2013.01); *H04W 48/18* (2013.01); *H04W 88/02* (2013.01)

(58) Field of Classification Search
CPC ... H04W 36/08; H04W 36/14; H04W 74/004; H04W 88/02; H04W 88/08; H04W 52/0206; H04W 84/10; H04W 4/02; H04W 4/023; H04W 4/027; H04W 4/046; H04W 4/12; H04W 4/14; H04W 4/24; H04W 4/40; H04W 4/00; H04W 40/02; H04W 48/02; H04W 48/04; H04W 48/08; H04W 48/16; H04W 48/20; H04W 72/04; H04W 72/0453; H04W 16/14; H04W 12/00; H04W 8/18; H04L 12/2856; H04L 12/06; H04L 12/08; H04L 63/0435; H04L 63/08; H04L 63/04; H04L 63/0853; H04L 63/0876; H04L 63/101; H04L 63/102; H04L 63/108; H04L 41/0803; Y02D 70/00; Y02D 70/22
USPC ........ 370/331; 455/410, 414.1, 432.3, 435.1, 455/456.3, 433
See application file for complete search history.

(56) References Cited

U.S. PATENT DOCUMENTS

| 2006/0229080 | A1* | 10/2006 | Khan | H04W 48/18 |
| | | | | 455/450 |
| 2013/0079001 | A1* | 3/2013 | Edara | H04W 52/0254 |
| | | | | 455/433 |
| 2013/0137475 | A1* | 5/2013 | Rousu | H04W 72/0453 |
| | | | | 455/509 |

(Continued)

*Primary Examiner* — Un C Cho
*Assistant Examiner* — Rasha K Fayed

(57) ABSTRACT

A device may receive a request to access a network service from a user equipment (UE) roaming on a visiting public mobile network (VPMN). The device may receive UE radio frequency (RF) band information that identifies a UE supported set of RF spectrum bands, and may receive VPMN RF band information that identifies a VPMN supported set of RF spectrum bands. The device may determine whether to permit or deny access to the network service based on the UE RF band information and the VPMN RF band information, and may provide an instruction to permit or deny access to the network service based on the UE RF band information and the VPMN RF band information.

20 Claims, 8 Drawing Sheets

(56) References Cited

U.S. PATENT DOCUMENTS

2014/0106709 A1* 4/2014 Palamara ............... H04W 8/18
 455/411
2015/0282052 A1* 10/2015 Wallen ................. H04W 48/16
 455/434

* cited by examiner

SELECTIVELY PROVIDING ACCESS TO NETWORK SERVICES BASED ON FREQUENCY BAND INFORMATION

BACKGROUND

A radio access technology (RAT), such as a Long-Term Evolution (LTE) RAT, may be associated with one or more radio frequency (RF) spectrum bands. An RF spectrum band is a section of the spectrum of radio communication frequencies (e.g., the RF spectrum band includes a range of frequencies). A network, which supports a particular RAT, may use the RAT to communicate with devices associated with the network using frequencies (e.g., carrier frequencies) within the one or more RF spectrum bands.

DETAILED DESCRIPTION OF PREFERRED EMBODIMENTS

Figure 1A:
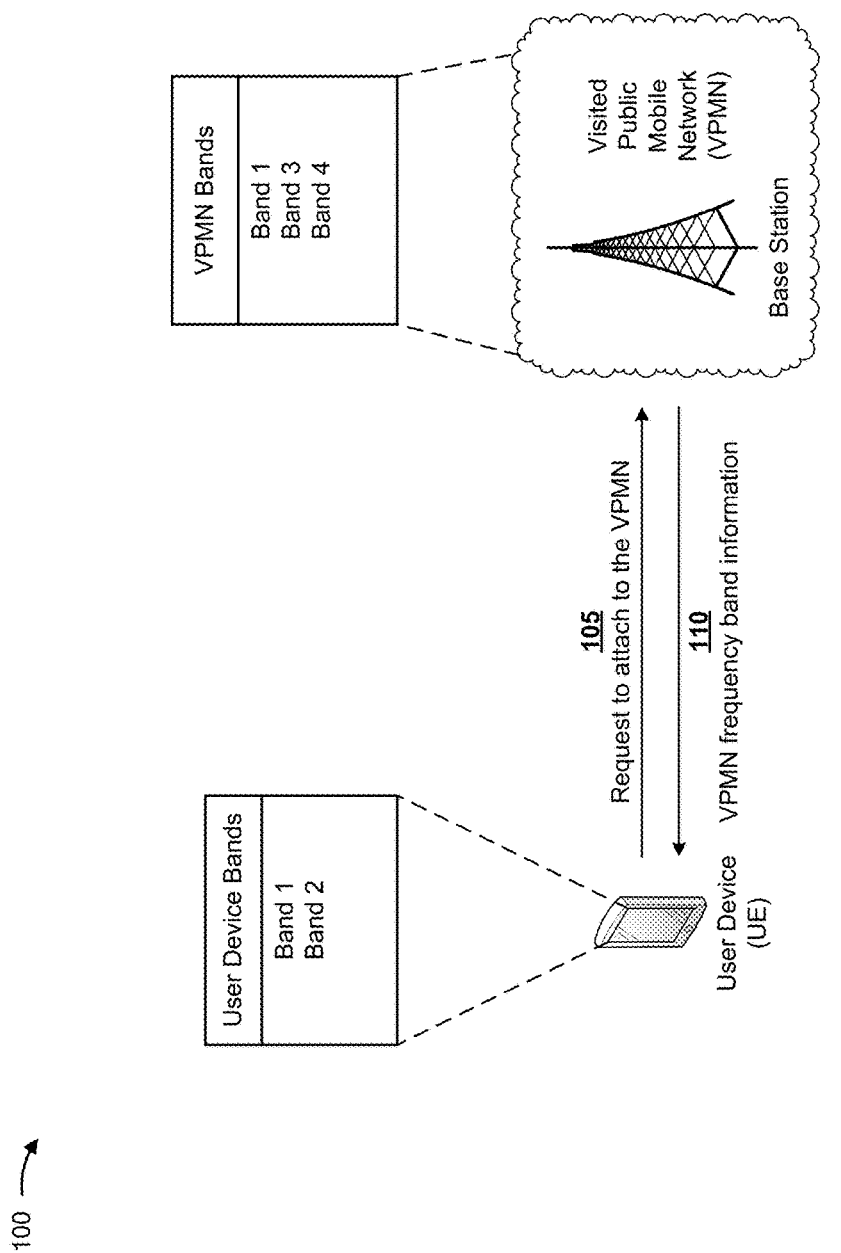
FIGS. 1A-1C are diagrams of an overview of an example implementation described herein.

The following detailed description of example implementations refers to the accompanying drawings. The same reference numbers in different drawings may identify the same or similar elements.

A RAT, such as an LTE RAT, may be associated with one or more RF spectrum bands. A network, which supports a particular RAT, may use the RAT to communicate with devices associated with the network using frequencies within the one or more RF spectrum bands. In some implementations, such as with a network that supports an LTE RAT, a RAT may be associated with a primary coverage band (e.g., a spectrum band used as a primary band for communications associated with user equipment (UE), such as voice calls or data services) and a capacity band (e.g., a spectrum band that can be used to increase capacity for communications associated with a UE). In some implementations, the primary coverage band may cover a larger geographic area and penetrate structures more successfully than the capacity band. Thus, the capacity band may be a backup band for the primary coverage band.

A UE may be configured to communicate using one or more RF spectrum bands. If a UE is associated with a first network operator (e.g., a network operator in the United States), the UE may be able to communicate using one or more RF spectrum bands associated with the first network operator. However, the UE may have issues communicating reliably via a network associated with a second network operator (e.g., a network operator in Europe) because the UE may not be able to communicate using all necessary RF spectrum bands associated with the second network operator. For example, the UE may have issues using a RAT service when the UE is roaming in a visited public mobile network (VPMN) (e.g., as compared to a home public mobile network (HPMN), which is a network with which the UE has a subscription) because the UE is not capable of communicating using an RF spectrum band (e.g., the primary coverage band) associated with the VPMN. When the UE is roaming in a VPMN, the HPMN associated with the UE may not have access to complete information regarding the frequency band coverage of the VPMN. As a result, the UE may make decisions regarding network services (e.g., VoLTE, SMS, etc.) and RATs to use during roaming periods. However, the UE may make poor decisions regarding these network services because the UE does not have access to specific details regarding the RF spectrum bands associated with the VPMN (e.g., which RF spectrum bands are primary coverage bands, which RF spectrum bands are capacity bands, etc.).

Implementations described herein allow a UE roaming on a VPMN to transmit RF spectrum band information for both the UE and the VPMN to allow one or more devices on the HPMN to determine which network services the UE is allowed to access. By determining which network services the UE may access, the UE roaming on the network may receive higher quality network services because the one or more devices on the HPMN may deny the UE access to network services that may lead to a negative user experience (e.g., a poor connection during a voice over long term evolution (VoLTE) call), while allowing the UE access to network services that may lead to a positive user experience (e.g., a strong connection during a VoLTE call).

Figure 1B:
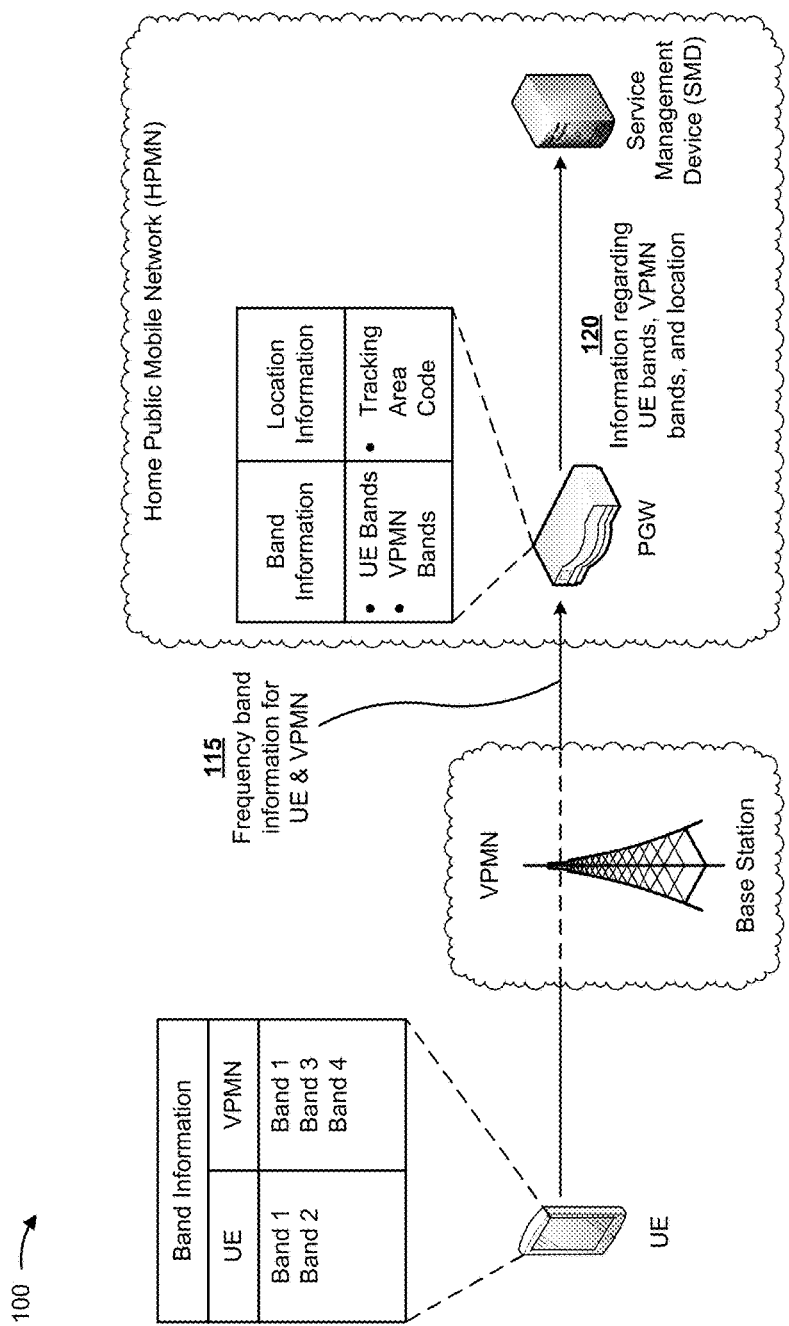
Figure 1C:
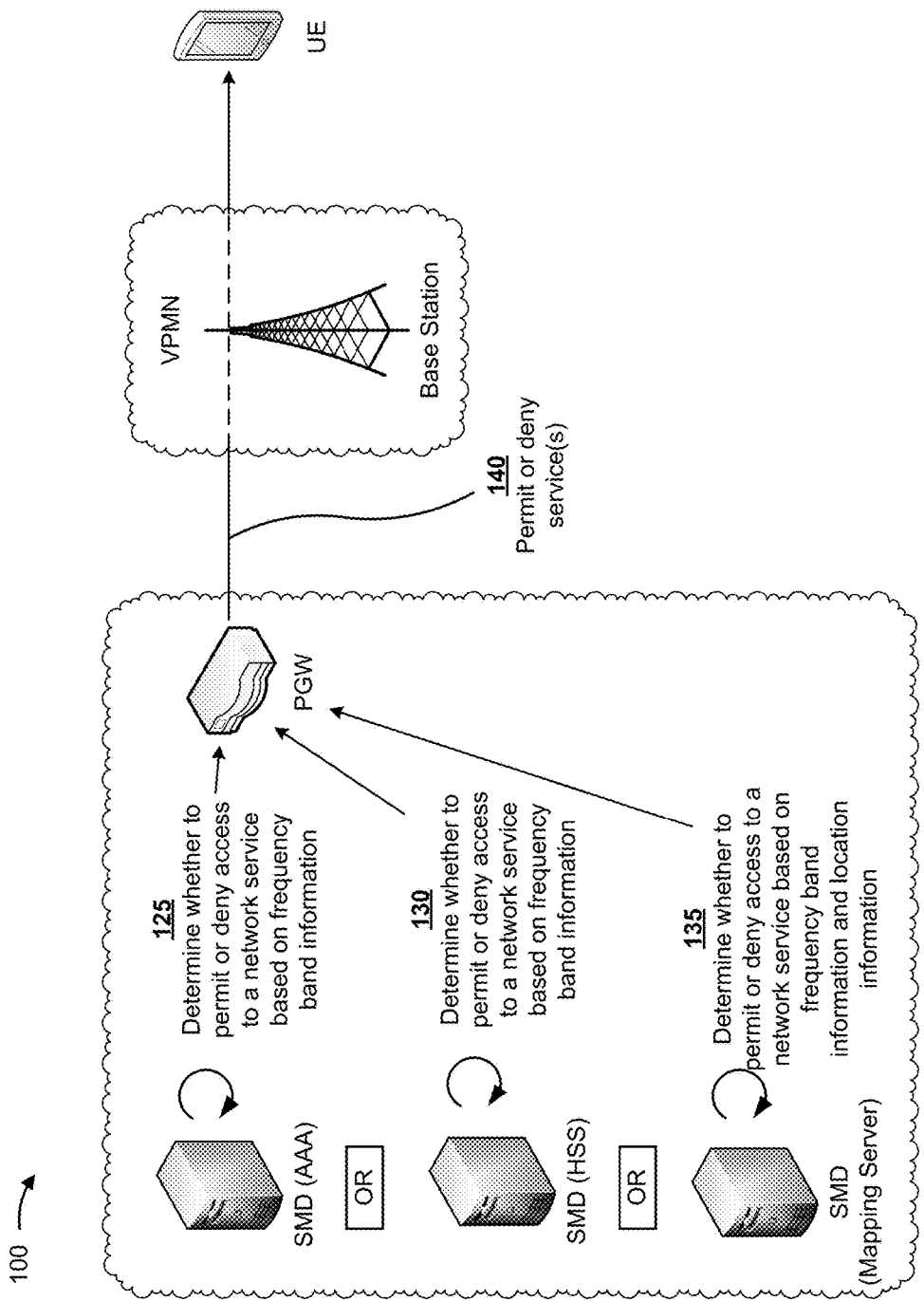

FIGS. 1A-1C are diagrams of an overview of an example implementation 100 described herein. For the purposes of FIG. 1A, assume that a UE is roaming in a coverage area associated with a VPMN. As shown by reference number 105, the UE may request to attach to the VPMN via a base station (e.g., the UE sends a request to attach to the VPMN using an LTE RAT). As shown by reference number 110, the base station of the VPMN sends the UE VPMN frequency band information indicating which RF spectrum bands are supported by the VPMN. As an example, and as shown, the VPMN may send frequency band information indicating that the VPMN supports RF spectrum band 1, RF spectrum band 3, and RF spectrum band 4. The UE may store information that identifies the VPMN supported frequency bands (e.g., RF spectrum band 1, RF spectrum band 3, and RF spectrum band 4), and may also store information that identifies the UE supported frequency bands (e.g., RF spectrum band 1 and RF spectrum band 2).

As shown in FIG. 1B, and by reference number 115, the UE may send a request, via the base station of the VPMN, to register to use a network service (e.g., an IMS service, such as VoLTE, SMS, or the like) after the UE has attached to the VPMN. The request includes frequency band information for both the UE and the VPMN (e.g., information indicating that the UE supports RF spectrum band 1 and RF spectrum band 2, while the VPMN supports RF spectrum band 1, RF spectrum band 3, and RF spectrum band 4). As shown, the base station forwards the frequency band information to a packet data network gateway (PGW), which is part of an HPMN associated with the UE. Once received, the PGW stores the frequency band information, and may also store information about the location of the UE (e.g., using a tracking area code (TAC) that indicates the location of the UE). As shown by reference number 120, the PGW sends information regarding the UE bands, the VPMN bands, and the location to a service management device for further processing. The service management device may include, for example, an authentication-authorization-accounting (AAA) server, a home subscriber server (HSS), and/or a mapping server, and may have access to one or more data structures that store the information regarding the UE bands, the VPMN bands, and the location.

As shown in FIG. 1C, the service management device may determine whether to permit or deny access to a network service based on the frequency band information associated with the UE and the VPMN. For example, as shown by reference number 125, the service management device may determine whether to permit or deny access to a network service (e.g., an IMS service) based on the frequency band information. For example, the service management device (e.g., the AAA server) may access a data structure that stores frequency band information and may compare the RF spectrum bands supported by the UE to the RF spectrum bands supported by the VPMN. As an example, the service management device (e.g., the AAA server) may search the data structure to determine whether the UE supports the primary coverage band of the VPMN. Other example determinations are described in more detail elsewhere herein.

As shown by reference number 130, the service management device may determine whether to permit or deny access to a network service based on the frequency band information. For example, the service management device (e.g., the HSS) may determine whether to permit or deny access to a network service (e.g., an IMS service) based on a condition associated with frequency bands supported by the UE and the VPMN. The service management device (e.g., the HSS) may access a data structure that stores frequency band information and may compare the RF spectrum bands supported by the UE to the RF spectrum bands supported by the VPMN to determine whether the RF spectrum bands supported by the UE and the VPMN satisfy a condition. As an example, the service management device (e.g., the HSS) may search the data structure to determine whether the UE and the VPMN support any of the same frequency bands (e.g., a primary coverage band of the VPMN), whether the UE and the VPMN support a threshold quantity of the same frequency bands, or the like. Other example determinations are described in more detail elsewhere herein.

As shown by reference number 135, the service management device may determine whether to permit or deny access to a network service based on frequency band information and location information. For example, the service management device (e.g., the mapping server) may permit or deny access to a network service (e.g., an IMS service) by comparing matching frequency bands of the UE and VPMN to the frequency bands obtained from other UEs (e.g., UEs previously roaming on the VPMN). For example, the service management device (e.g., the AAA, the HSS, etc.) may access a data structure to compare the frequency band information of the UE and the frequency band information of the VPMN to determine matching frequency bands supported by both the UE and the VPMN. The service management device (e.g., the mapping server) may also access a data structure to compare the matching frequency band information of the UE and VPMN to the frequency band information of other UEs roaming (e.g., currently or previously) on the VPMN. The service management device (e.g., the AAA server, the HSS, the mapping server, etc.) may permit or deny access to a network service (e.g., an IMS service) based on the comparison between the matching frequency band information of the UE and VPMN and the frequency band information obtained from other UEs roaming (e.g., currently or previously) on the VPMN. As an example, if a threshold number of other UEs successfully used a network service when roaming on the VPMN, and the frequency bands associated with the network service are also supported by the UE requesting network service access, the service management device (e.g., the mapping server) may permit access to the network service.

As shown by reference number 140, the PGW may transmit, via a base station of the VPMN, an instruction to permit or deny access to a network service based on the determination by the service management device. As shown, the base station may forward the access information for one or more network services (e.g., IMS services) to the UE. For example, the PGW may transmit a message to the UE (via the base station of the VPMN) that permits access to one or more network services (e.g., one or more IMS services), denies access to one or more network services (e.g., one or more IMS services), or permits access to a first network service (e.g., an IMS service such as SMS) and denies access to a second network service (e.g., an IMS service such as VoLTE).

By using intelligent RF spectrum band reporting, the UE roaming on the VPMN receives higher quality network services. For example, intelligent RF spectrum band reporting allows the service management device to deny the UE access to network services that would lead to a negative user experience (e.g., a poor connection during a VoLTE call due to a low number of RF spectrum band matches between the UE and the VPMN), while allowing the UE access to network services that may lead to a positive user experience (e.g., a strong connection during a VoLTE call due to a high number of RF spectrum band matches between the UE and the VPMN). In addition, the service management device conserves network resources by limiting network traffic (e.g., the service management device may deny access to IMS services under poor radio access network conditions, resulting in reduced overall network traffic and data use).

As indicated above, FIGS. 1A-1C are provided merely as an example. Other examples are possible and may differ from what was described with regard to FIGS. 1A-1C.

Figure 2:
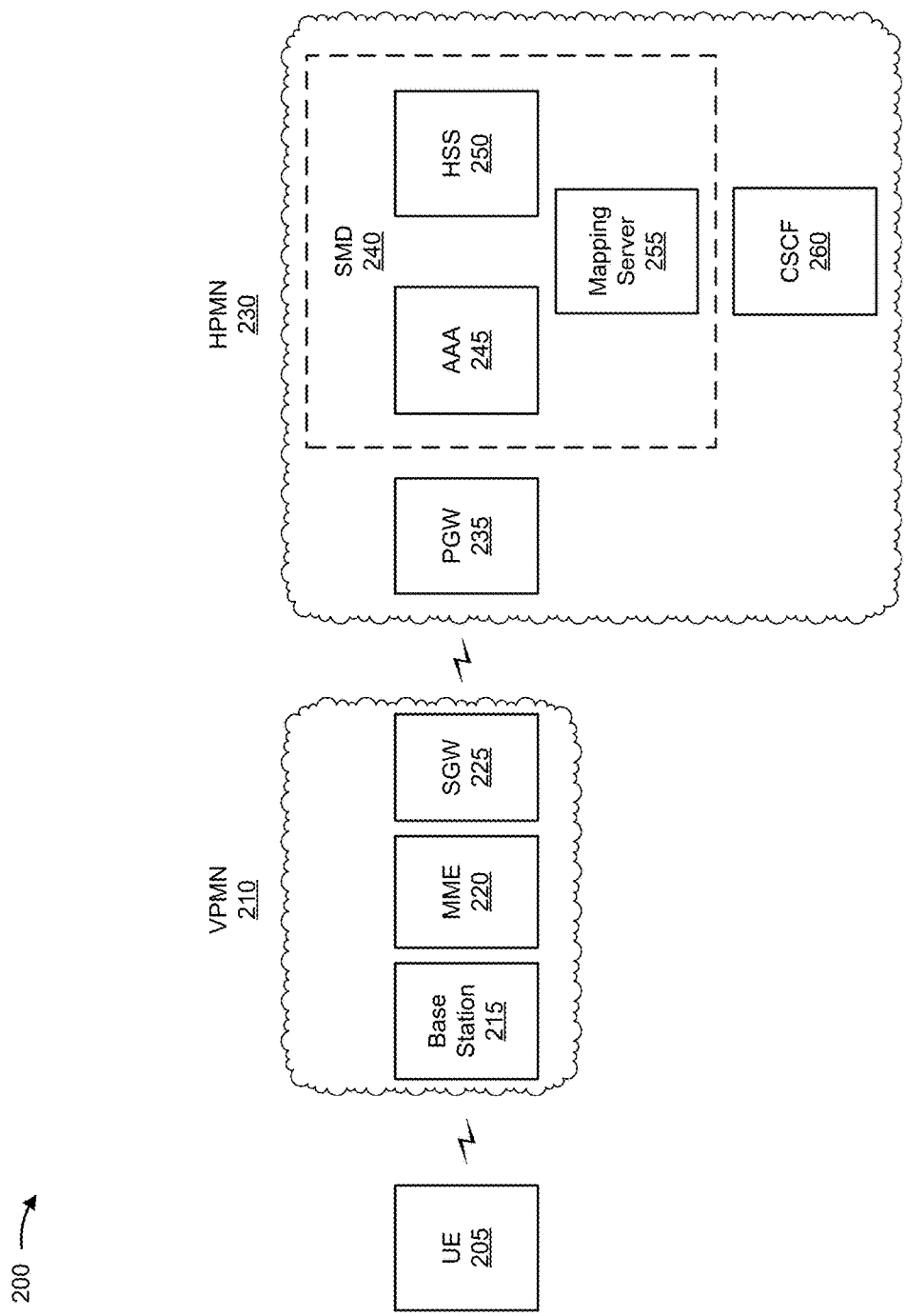
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a UE 205, a VPMN 210, a base station 215, a mobility management entity (MME) 220, a serving gateway (SGW) 225, an HPMN 230, a PGW 235, a service management device 240, an AAA 245, an HSS 250, a mapping server 255, and a call session control function (CSCF) 260. Devices of environment 200 may interconnect via wired connections, wireless connections, or a combination of wired and wireless connections.

UE 205 includes one or more devices capable of communicating with base station 215 and/or a network (e.g., VPMN 210 and/or HPMN 230). For example, UE 205 may include a wireless communication device, a radiotelephone, a personal communications system (PCS) terminal (e.g., that may combine a cellular radiotelephone with data processing and data communications capabilities), a smart phone, a wearable device (e.g., smart glasses or a smart watch), a laptop computer, a tablet computer, a personal gaming system, and/or a similar device. UE 205 may transmit traffic to and/or receive traffic from base station 215. In some implementations, UE 205 may be associated with HPMN 230 through a subscription, and may be roaming on VPMN 210.

VPMN 210 includes one or more wired and/or wireless networks. For example, VPMN 210 may include a cellular network, such as a second generation (2G) network (e.g., a global system for mobile communication (GSM) network), a third generation (3G) network (e.g., a universal mobile telecommunications system (UMTS) network), a fourth generation (4G) network (e.g., an LTE network), a fifth generation (5G) network, or the like. Additionally, or alternatively, VPMN 210 may include a code division multiple access (CDMA) network, a public land mobile network (PLMN), a wireless wide area network (WWAN), and/or a combination of these or other types of networks. In some implementations, VPMN 210 may include a network that UE 205 can communicate with when roaming outside of an area covered by HPMN 230. VPMN 210 may establish this communication with UE 205 using base station 215.

Base station 215 includes one or more devices capable of transferring traffic, such as audio, video, text, and/or other traffic, destined for and/or received from UE 205. In some implementations, base station 215 may include an Evolved Node B (eNB) associated with VPMN 210. Base station 215 may send traffic to and/or receive traffic from UE 205 via an air interface. In some implementations, base station 215 may include a small cell base station, such as a base station of a microcell, a picocell, and/or a femtocell. Base station 215 may support one or more RATs, such as a GSM RAT, a UMTS RAT, an LTE RAT, or the like.

MME 220 includes one or more devices, such as one or more server devices, capable of managing authentication, activation, deactivation, and/or mobility functions associated with UE 205. In some implementations, MME 220 may perform operations relating to authentication of UE 205. Additionally, or alternatively, MME 220 may facilitate the selection of a particular SGW 225 and/or a PGW of VPMN 210 to serve traffic to and/or from UE 205. MME 220 may perform operations associated with handing off UE 205 from a first base station 215 to a second base station 215 when UE 205 is transitioning from a first cell associated with the first base station 215 to a second cell associated with the second base station 215. Additionally, or alternatively, MME 220 may select another MME (not pictured), to which UE 205 should be handed off (e.g., when UE 205 moves out of range of MME 220).

SGW 225 includes one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations 215 associated with VPMN 210, and may send the aggregated traffic to HPMN 230 (e.g., via PGW 235 and/or a PGW of VPMN 210) and/or other network devices. SGW 225 may also receive traffic from HPMN 230 and/or other network devices, and may send the received traffic to UE 205 via base station 215.

HPMN 230 includes one or more wired and/or wireless networks. For example, HPMN 230 may include a cellular network, such as a second generation (2G) network (e.g., a GSM network), a third generation (3G) network (e.g., a UMTS network), a fourth generation (4G) network (e.g., an LTE network), a fifth generation (5G) network, or the like. Additionally, or alternatively, HPMN 230 may include a code division multiple access (CDMA) network, a public land mobile network (PLMN), a wireless wide area network (WWAN), and/or a combination of these or other types of networks. In some implementations, HPMN 230 may be associated with UE 205. For example, HPMN 230 may be a home network with which UE 205 has a subscription. In some implementations, HPMN 230 may route traffic for UE 205 using PGW 235.

PGW 235 includes one or more devices capable of providing connectivity for UE 205 to external packet data networks. For example, PGW 235 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 235 may receive traffic (e.g., RF spectrum band information) from SGW 225, and may send the traffic (e.g., RF spectrum band information, location information, etc.) to service management device 240, AAA 245, HSS 250, mapping server 255, CSCF 260, and/or a combination of these devices. Additionally, or alternatively, PGW 235 may receive traffic from service management device 240, AAA 245, HSS 250, mapping server 255, CSCF 260, and/or a combination of these devices, and may send the traffic to UE 205 via SGW 225 and base station 215.

Service management device 240 includes one or more devices capable of receiving, generating, storing, processing, and/or providing information related to UE 205 and VPMN 210. For example, service management device 240 may include a computing device, such as a server, a network device (e.g., a traffic transfer device, a gateway, a router, a switch, a firewall, a hub, etc.), or a similar device. As an example, and as shown, service management device 240 may include one or more of AAA 245, HSS 250, and/or mapping server 255. In some implementations, service management device 240 may include MME 220.

AAA 245 includes one or more devices, such as one or more server devices, that perform authentication, authorization, and/or accounting operations for communication sessions associated with UE 205. For example, AAA 245 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, a quantity of RF signals transmitted, a quantity of radio access bearers requested and/or established, etc.), and/or may perform similar operations.

HSS 250 includes one or more devices, such as one or more server devices, capable of managing (e.g., receiving, generating, storing, processing, and/or providing) information associated with UE 205. For example, HSS 250 may manage subscription information associated with UE 205, such as information that identifies a subscriber profile of a user associated with UE 205, information that identifies network services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 250 may provide this information to one or more other devices of environment 200 to support the operations performed by those devices.

CSCF 260 includes one or more devices, such as one or more server devices, capable of managing signal and control functions in an Internet Protocol (IP) Multimedia Subsystem (IMS) network and/or capable of managing session initiation protocol (SIP) based network services. CSCF 260 may include a proxy call session control function (P-CSCF), an interrogating call session control function (I-CSCF), and/or a serving call session control function (S-CSCF). In some implementations, CSCF 260 may process and/or route information to and/or from AAA 245 and/or mapping server 255. For example, CSCF 260 may process voice calls associated with UE 205.

Mapping server 255 includes one or more devices, such as one or more server devices, capable of performing mapping functions associated with permitting or denying network services to UE 205. For example, mapping server 255 may include a server, a group of servers, a desktop computer, a laptop computer, or the like. In some implementations, mapping server 255 may be internal to HPMN 230. In some implementations, mapping server may be external to HPMN 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
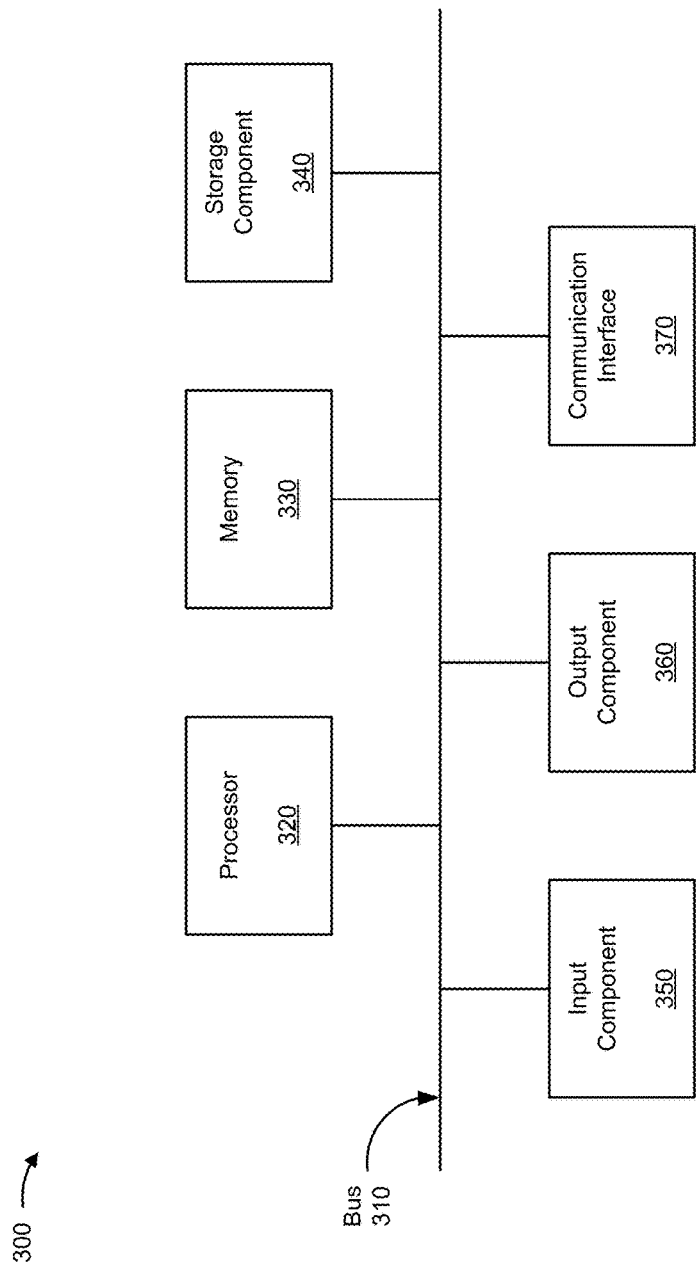
FIG. 3 is a diagram of example components of one or more devices of FIG. 2.

FIG. 3 is a diagram of example components of a device 300. Device 300 may correspond to UE 205, base station 215, MME 220, SGW 225, PGW 235, service management device 240, AAA 245, HSS 250, mapping server 255, and/or CSCF 260. In some implementations, UE 205, base station 215, MME 220, SGW 225, PGW 235, service management device 240, AAA 245, HSS 250, mapping server 255, and/or CSCF 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
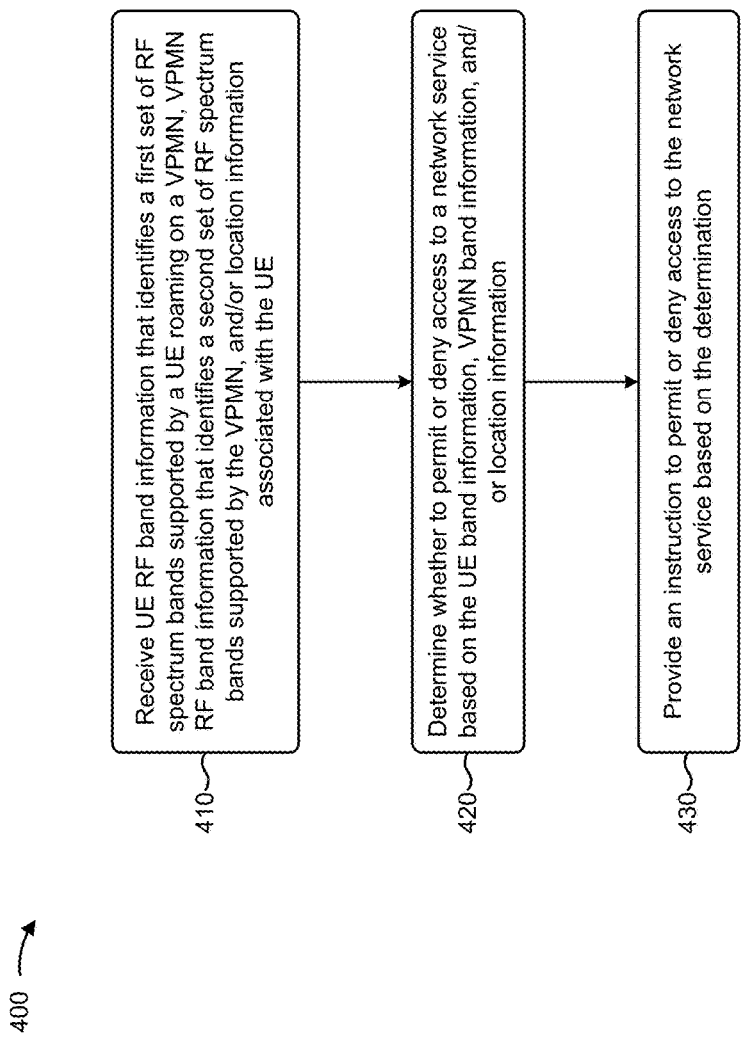
FIG. 4 is a flow chart of an example process for permitting or denying access to a network service based on frequency band information and/or location information.

FIG. 4 is a flow chart of an example process 400 for permitting or denying access to a service based on frequency band information and/or location information. In some implementations, one or more process blocks of FIG. 4 may be performed by service management device 240 (e.g., AAA 245, HSS 250, and/or mapping server 255). In some implementations, one or more process blocks of FIG. 4 may be performed by another device or a group of devices separate from or including service management device 240, such as UE 205, base station 215, MME 220, SGW 225, PGW 235, and/or CSCF 260.

As shown in FIG. 4, process 400 may include receiving UE RF band information that identifies a first set of RF spectrum bands supported by a UE roaming on a VPMN, VPMN RF band information that identifies a second set of RF spectrum bands supported by the VPMN, and/or location information associated with the UE (block 410). For example, service management device 240 may receive, from UE 205, RF band information that identifies a first set of RF spectrum bands supported by UE 205 and a second set of RF bands supported by VPMN 210. Additionally, or alternatively, service management device 240 may receive, from PGW 235, location information associated with UE 205.

In some implementations, UE 205 may be configured to use a first set of RF spectrum bands (e.g., UE-supported RF spectrum bands) that allow UE 205 to communicate using the frequencies in the first set of RF spectrum bands. The first set of RF spectrum bands may be associated with a RAT of a network (e.g., an LTE RAT) and UE 205 may use the RAT to communicate via the network. UE 205 may access the information identifying the first set of RF spectrum bands from memory. For example, UE 205 may be configured to support a particular set of RF spectrum bands, and may store information that identifies the particular set of RF spectrum bands that UE 205 is configured to support.

In some implementations, VPMN 210 (e.g., base station 215 of VPMN 210) may be configured and/or provisioned with a second set of RF spectrum bands (e.g., VPMN-supported RF spectrum bands) that may provide network access via a RAT of VPMN 210. For example, VPMN 210 may be provisioned with a second set of RF spectrum bands which may be assigned (e.g., by an authority that assigns RF spectrum bands, such as the Federal Communications Commission (FCC) of the United States) and may be used to provide network access via a RAT. As an example, for an LTE RAT, VPMN 210 may be assigned a primary coverage band and one or more capacity bands. The primary coverage band may be used as a primary band for communications associated with UE 205. The one or more capacity bands may be used to increase capacity for communications associated with UE 205.

VPMN 210 may include a roaming network to which UE 205 is not subscribed, but that UE 205 may use for network access. UE 205 may use VPMN 210 for network services (e.g., IMS services) because of an agreement between an operator of VPMN 210 and an operator of HPMN 230 (e.g., to which UE 205 is subscribed) that allows UE 205 to access the network services.

In some implementations, UE 205 may use a RAT (e.g., an LTE RAT) to request to attach to a network associated with the RAT (e.g., VPMN 210). For example, UE 205 may send base station 215 an initial message (e.g., an attachment request), to begin attachment to an LTE network, that includes basic information associated with UE 205. In addition to basic information associated with UE 205, the initial message may include a request to register for an IMS service (e.g., by requesting to establish an IMS PDN connection). The request to register for an IMS service may include protocol configuration options (PCOs). PCOs may include information identifying the first set of RF spectrum bands, information identifying the second set of RF spectrum bands, and/or any other information that may allow service management device 240 to make access decisions regarding network services.

In some implementations, UE 205 may request to register for an IMS service after completing the initial attachment to VPMN 210. For example, UE 205 may request to register for an IMS service by sending messages to initiate the IMS service, including messages associated with supported network services, quality of service, and initial setup information (e.g., such as an access point name (APN)). In response to the attachment request and/or the registration request, VPMN 210 may transmit broadcast information to UE 205 (e.g., via base station 215) that identifies a second set of RF spectrum bands. UE 205 may store information identifying the second set of RF spectrum bands, and may store information identifying the first set of RF spectrum bands for subsequent transmission to one or more devices associated with HPMN 230 (e.g., PGW 235, service management device 240, etc.).

In some implementations, service management device 240 may receive RF band information (e.g., information identifying the first set of RF spectrum bands and the second set of RF spectrum bands) from UE 205. For example, service management device 240 may receive RF band information from UE 205 using PGW 235 as an intermediary. In this case, PGW 235 may receive RF band information from UE 205 and route the RF band information to service management device 240. As an example, the RF band information may be transmitted from UE 205 to PGW 235 after UE 205 makes an IMS PDN connection request. In some implementations, service management device 240 may store RF band information in a data structure. For example, service management device 240 may store the RF band information in a data structure that pairs the RF spectrum bands of UE 205 with the RF spectrum bands of VPMN 210.

In some implementations, service management device 240 may receive RF band information and location information associated with UE 205. For example, in addition to receiving RF band information associated with UE 205 and VPMN 210, service management device 240 may receive location information. Location information may include UE tracking information such as a mobile country code-mobile network code (MCC-MNC), a tracking area code (TAC), global positioning system (GPS) information, or the like. Service management device 240 may receive location information from UE 205 while roaming on VPMN 210 (e.g., base station 215 of VPMN 210 may transmit the location information to PGW 235, and PGW 235 may then send the location information to service management device 240). In some implementations, service management device 240 may store RF band information and location information in a data structure. For example, service management device 240 may store the RF band information and location information in a data structure that pairs the RF spectrum bands of UE 205 and VPMN 210 with the location information of UE 205.

As further shown in FIG. 4, process 400 may include determining whether to permit or deny access to a network service based on the UE band information, the VPMN band information, and/or the location information (block 420). For example, service management device 240 may determine whether to permit or deny UE 205 access to a service (e.g., an IMS service) based on the UE band information, the VPMN band information, and/or the location information. A network service may include a voice service (e.g., VoLTE, video on demand (VoD), etc.), a data service (e.g., SMS, e-mail, etc.), and/or another type of network service.

In some implementations, service management device 240 may determine whether to permit or deny access to a network service by comparing the RF spectrum bands supported by UE 205 to the primary coverage band of VPMN 210. For example, service management device 240 (e.g., AAA 245 and/or HSS 250) may permit or deny access to a network service (e.g., IMS service) by comparing the first set of RF spectrum bands supported by UE 205 to the primary coverage band of VPMN 210. As an example, service management device 240 may search a data structure to compare the first set of RF spectrum bands of UE 205 to the primary coverage band of VPMN 210. Here, service management device 240 is able to differentiate between the primary coverage band of VPMN 210 and capacity bands of VPMN 210 due to the roaming agreement between VPMN 210 and HPMN 230. In this case, service management device 240 may permit or deny access to a network service (e.g., an IMS service) based on whether the primary coverage band of VPMN 210 is supported by UE 205 (e.g., whether the primary coverage band is included in the first set of RF spectrum bands supported by UE 205). For example, when service management device 240 includes AAA 245, service management device 240 may permit access to a network service (e.g., an IMS service) when the primary coverage band of VPMN 210 is supported by UE 205, or may deny access to a network service (e.g., an IMS service) when the primary coverage band of VPMN 210 is not supported by UE 205. Additionally, or alternatively, service management device 240 may use additional information (e.g., stored by HSS 250) to permit or deny access to a network service (e.g., an IMS service) based on a condition associated with the UE-supported frequency bands and the VPMN-supported frequency bands.

In some implementations, service management device 240 may determine whether to permit or deny access to a network service based on a condition associated with the frequency bands. For example, when service management device 240 includes HSS 250, service management device 240 may permit or deny access to a network service (e.g., an IMS service) based on whether the total number of matching RF spectrum bands (e.g., between the first set of RF spectrum bands and the second set of RF spectrum bands) satisfies a threshold. As an example, service management device 240 may search a data structure to determine whether there is a threshold match (e.g., a quantity or a percentage of matching bands between the first set of RF spectrum bands and the second set of RF spectrum bands). In this case, service management device 240 may permit or deny access to a network service based on the threshold match. For example, service management device 240 may permit access to a network service (e.g., when a first threshold is satisfied), may deny access to a network service (e.g., when the first threshold is not satisfied), may permit access to a first network service and deny access to a second network service (e.g., the first network service may be associated with a first threshold, the second network service may be associated with a second threshold, and the first threshold may be satisfied for the first network service but the second threshold may not be satisfied for the second network service), or the like.

In some implementations, service management device 240 may determine whether to permit or deny access to a network service based on frequency band information and location information. For example, when service management device 240 includes mapping server 255, service management device 240 may determine whether to permit or deny access to a network service (e.g., an IMS service) by comparing the RF spectrum band information and location information associated with UE 205 and VPMN 210 to stored RF spectrum band information and location information obtained from other UEs 205 (e.g., UEs 205 currently or previously roaming on VPMN 210). In some implementations, RF spectrum band information and location information obtained from other UEs 205 (e.g., UEs 205 currently or previously roaming on VPMN 210) may be stored on RF spectrum band location maps. RF spectrum band location maps may include information indicating which RF spectrum bands are being used for network services in specific geographic locations, information indicating the quality of service for RF spectrum band use in specific geographic locations, or the like.

As an example, service management device 240 may search one or more data structures to determine whether a threshold match exists between the RF spectrum band information and location information of UE 205 and VPMN 210 and the RF spectrum band information and location information obtained from other UEs 205 (e.g., UEs 205 currently or previously roaming on VPMN 210). In this case, service management device 240 may permit or deny access to a network service based on the threshold match. For example, the threshold match may be satisfied when a quantity or percentage of other UEs 205 share the same RF spectrum band(s) as UE 205 and VPMN 210. Alternatively, service management device 240 may deny access to a network service (e.g., an IMS service) when the threshold match is not satisfied. Here, if a quantity or percentage of other UEs 205 do not share the same RF spectrum band(s) as UE 205 and VPMN 210, the threshold match is not satisfied and service management device 240 may deny access to the network service. Alternatively, service management device 240 may permit access to a first network service (e.g., an IMS service such as SMS) and may deny access to a second network service (e.g., an IMS service such as VoLTE) when a first threshold is satisfied for the first network service but a second threshold is not satisfied for the second network service.

In some implementations, service management device 240 may perform a combination of any of the above-described implementations. As an example, service management device 240 may first determine whether to permit or deny access to a network service by comparing the RF spectrum bands supported by UE 205 to the primary coverage band of VPMN 210 (e.g., UE 205 may support RF spectrum bands 1-4, VPMN 210 may support RF spectrum bands 4-7, and VPMN 210 may use RF spectrum band 7 as the primary coverage band). If UE 205 supports the primary coverage band of VPMN 210 (e.g., if UE 205 supports RF spectrum band 7), then service management device 240 may permit access to the network service. If UE 205 does not support the primary coverage band of VPMN 210 (e.g., if UE 205 does not support RF spectrum band 7), then service management device 240 may deny access to the network service or perform one or more additional determinations.

For example, service management device 240 may determine whether to permit or deny access to the network service by comparing all RF spectrum bands of UE 205 and VPMN 210 (e.g., by comparing RF spectrum bands 1-4 to RF spectrum bands 4-7) to determine if a threshold quantity of RF spectrum bands are supported by both UE 205 and VPMN 210. If the threshold quantity of RF spectrum bands are supported by both UE 205 and VPMN 210 (e.g., a threshold of 25% similarity in supported RF spectrum bands for UE 205 RF spectrum bands 1-4 and VPMN 210 RF spectrum bands 4-7), then service management device 240 may permit access to the service. If the threshold quantity of RF spectrum bands is not supported by both UE 205 and VPMN 210 (e.g., a threshold of 50% similarity in supported RF spectrum bands for UE 205 RF spectrum bands 1-4 and VPMN 210 RF spectrum bands 4-7), then service management device 240 may deny access to the network service or perform one or more additional determinations.

For example, service management device 240 may determine whether to permit or deny access to the network service by comparing all matching RF spectrum bands of UE 205 and VPMN 210 to RF spectrum bands obtained from other UEs 205 roaming (e.g., UEs 205 currently or previously roaming on VPMN 210) to determine if a threshold number of other UEs 205 all support the matching RF spectrum bands of UE 205 and VPMN 210. As an example, service management device 240 may first determine the matching RF spectrum bands between UE 205 and VPMN 210 (e.g., UE 205 RF spectrum bands 1-4 and VPMN 210 RF spectrum bands 4-7 have matching RF spectrum band 4). Next, service management device 240 may determine if a threshold number of other UEs 205 (e.g., 80%) support the matching RF spectrum bands of UE 205 and VPMN 210 (e.g., RF spectrum band 4). If the threshold number of other UEs 205 is satisfied (e.g., if at least 80% of other UEs 205 all support RF spectrum band 4, for a particular service, in a location close to UE 205), service management device 240 may permit access to the network service. If the threshold number of other UEs 205 is not satisfied (e.g., if less than 80% of other UEs 205 support RF spectrum band 4, for a particular service, in a location close to UE 205), service management device 240 may deny access to the network service.

In some implementations, MME 220 of VPMN 210 may determine whether UE 205 is permitted to access a network service. For example, MME 220 may be configured to determine whether UE 205 is permitted to access a network service (e.g., an IMS service) based on an identifier. As an example, MME 220 may receive information that identifies RF spectrum bands supported by UE 205 in an attach message from UE 205, and may compare the RF spectrum bands supported by UE 205 and the primary coverage band of VPMN 210. When the primary coverage band of VPMN 210 matches with at least one the RF spectrum bands supported by UE 205, MME 220 may set an identifier to a value that permits or denies access to the network service (e.g., the IMS service). For example, MME 220 may set an identifier to a value indicating an acceptance of an IMS service (e.g., identifier_value=1). In this case, UE 205 may access and register for the IMS service. Alternatively, MME 220 may set an identifier to a value indicating a rejection of an IMS service (e.g., identifier_value=0). In this case, UE 205 may not access and register for the IMS service. However, UE 205 may register for a RAT that provides a lower quality of service, but that is supported by both UE 205 and VPMN 210 (e.g., a 3G UMTS RAT, a 2G GSM RAT, etc.).

In this way, service management device 240 improves a user experience by permitting access to network services when connections are strong and lead to a positive user experience, and by denying access to network services when connections are poor and lead to a negative user experience. In addition, service management device 240 conserves network resources by limiting network traffic (e.g., service management device 240 may deny access to an IMS service in poor network conditions, which would reduce overall network traffic and data use).

As further shown in FIG. 4, process 400 may include providing an instruction to permit or deny access to the network service based on the determination (block 430). For example, service management device 240 may provide an instruction to base station 215 to permit or deny the network service (e.g., an IMS service) based on the determination described above in connection with block 420.

In some implementations, service management device 240 may provide an instruction to base station 215 that permits access to a network service. For example, service management device 240 may provide an instruction that permits access to a network service (e.g., that permits access to VoLTE due to adequate RF spectrum band support). In this case, service management device 240 may permit access to the service by transmitting information via PGW 235 to indicate that the IMS PDN connection request has been accepted and that UE 205 may perform IMS registration to access the network service (e.g., an IMS service such as VoLTE). Once received, UE 205 may be permitted to register for and access the network service.

In some implementations, service management device 240 may provide an instruction to base station 215 that denies access to a network service. For example, service management device 240 may provide an instruction to base station 215 to deny access to a network service (e.g., deny access to VoLTE due to inadequate RF spectrum band support). In this case, service management device 240 may deny access to the network service by transmitting information via PGW 235 to indicate that the IMS PDN connection request is rejected. Once the IMS PDN connection request is rejected, UE 205 will be denied from registering for the network service. However, UE 205 may register for a RAT that provides a lower quality of service, but that is supported by both UE 205 and VPMN 210 (e.g., a 3G UMTS RAT, a 2G GSM RAT, etc.).

In some implementations, service management device 240 may provide an instruction to permit a first service and to deny a second service. For example, service management device 240 may provide an instruction to base station 215 to permit access to a first network service (e.g., an IMS service such as SMS) and to deny access to a second network service (e.g., an IMS service such as VoLTE). In this case, service management device 240 may permit access to the first IMS service and may deny access to the second IMS service by transmitting information via PGW 235 that indicates that the IMS PDN connection is accepted but limits registration to the first IMS service (e.g., SMS). Once the IMS PDN connection request is accepted, UE 205 may access the first service (e.g., SMS), but not the second service (e.g., VoLTE).

By allowing service management device 240 to manage which network services UE 205 is permitted to access, UE 205 receives higher quality network services while roaming on VPMN 210. For example, service management device 240 improves the customer experience by permitting access to network services when connections are strong and lead to a positive user experience, and by denying access to network services when connections are poor and may lead to a negative user experience. In addition, service management device 240 conserves network resources by limiting network traffic (e.g., service management device 240 may deny access to an IMS service which would reduce overall network traffic and data use).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
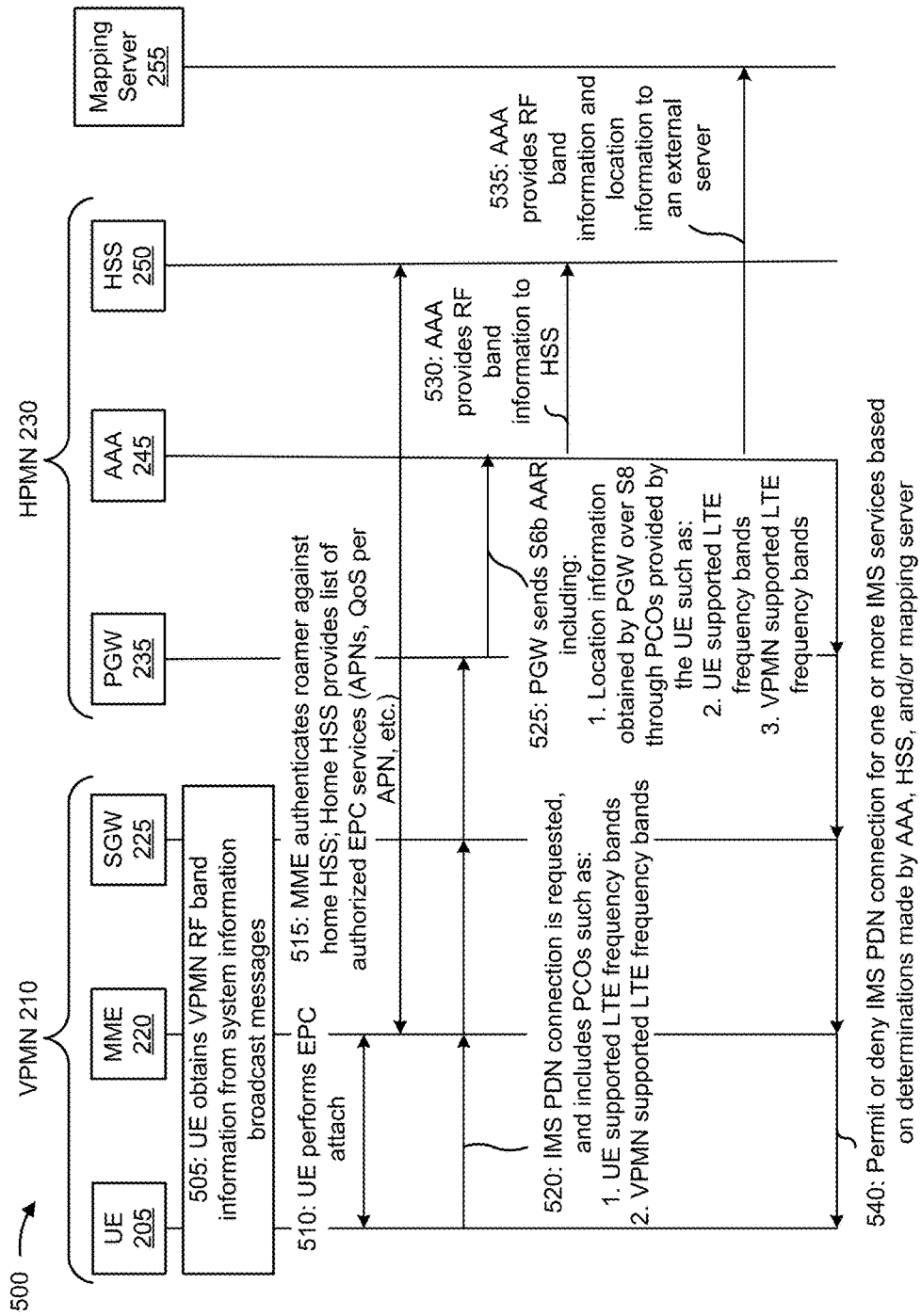
FIGS. 5A and 5B are call flow diagrams of example implementations relating to the example process shown in FIG. 4.
Figure 5B:
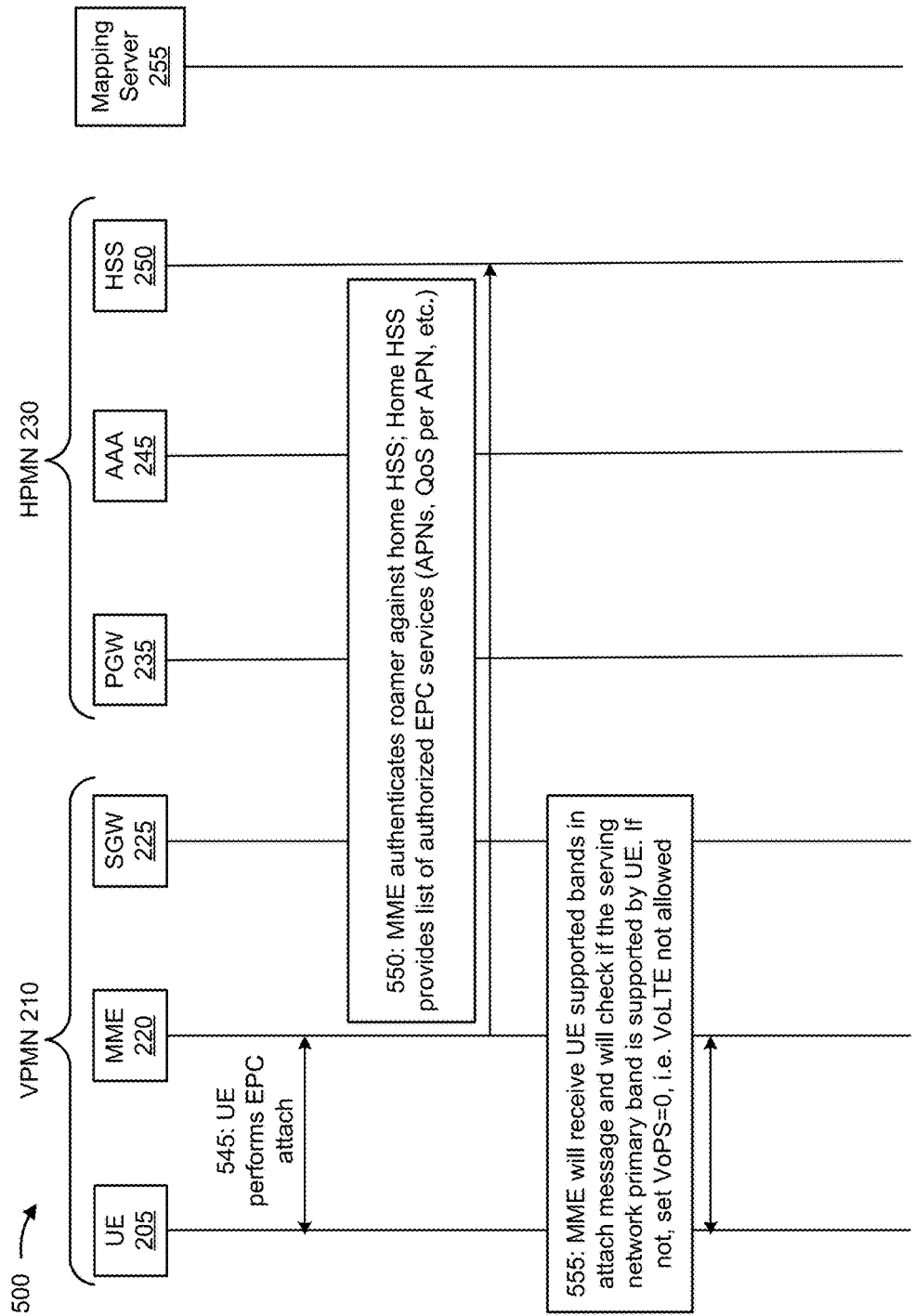

FIGS. 5A and 5B are call flow diagrams of example call flow 500 relating to example process 400, shown in FIG. 4. FIGS. 5A and 5B show an example of a process for permitting or denying access to a network service based on frequency band information and/or location information.

For FIGS. 5A and 5B, as an example, UE 205 may be configured to support a first set of RF spectrum bands that includes RF spectrum bands 1-4, and VPMN 210 may be configured to support a second set of RF spectrum bands that includes RF spectrum bands 4-7, where RF spectrum band 7 is the primary coverage band and RF spectrum bands 4-6 are the capacity bands. In this case, UE 205 may be roaming on VPMN 210, and may request access to IMS services supported by VPMN 210. As shown in FIG. 5A, and by reference number 505, UE 205 may obtain VPMN frequency band information identified in system information broadcast messages. For example, UE 205 may obtain VPMN frequency band information that includes the VPMN supported frequency bands (e.g., RF spectrum bands 4-7). UE 205 may store information identifying VPMN frequency bands (e.g., RF spectrum bands 4-7) and information identifying UE 205 supported frequency bands (e.g., RF spectrum bands 1-4).

As shown by reference number 510, UE 205 may perform an evolved packet core (EPC) attach to VPMN 210 via MME 220. For example, UE 205 may send base station 215 an attach request, and base station 215 may route the request to MME 220. As shown by reference number 515, MME 220 may authenticate the roaming UE 205 by requesting authorized EPC services from HSS 250 of HPMN 230. As a result of the request, HSS 250 may provide MME 220 with a list of authorized EPC services (e.g., APNs, quality of service (QoS) per APN, etc.).

As shown by reference number 520, UE 205 may send PGW 235 of HPMN 230 a request to register for an IMS service. In some implementations, UE 205 may request to register for an IMS service by sending messages to initiate the IMS service, including messages associated with supported network services, QoS, and initial setup information (e.g., APN). The request to register for an IMS service may also include PCOs that include information identifying the first set of RF spectrum bands supported by UE 205 and the second set of RF spectrum bands supported by VPMN 210.

As shown by reference number 525, PGW 235 may send an authentication & authorization request (AAR) to AAA 245 (e.g., using an S6b Diameter interface) that includes UE frequency band information, VPMN frequency band information, and location information. As an example, PGW 235 may send, to AAA 245, an AAR that includes information identifying UE 205 supported frequency bands (e.g., RF spectrum bands 1-4) and information identifying VPMN 210 supported frequency bands (e.g., RF spectrum bands 4-7). In addition, PGW 235 may send location information identifying the geographic location of UE 205 and/or location information identifying the geographic location of other UEs 205 currently roaming on VPMN 210. In this case, PGW 235 is able to send the location information to AAA 245 by accessing a data structure that stores location information for all roaming network devices. Once PGW 235 retrieves the location information from the data structure, PGW 235 sends the location information to AAA 245 for further processing.

As shown by reference number 530, AAA 245 may provide RF spectrum band information to HSS 250. As an example, AAA 245 may provide RF spectrum band information that identifies UE 205 supported frequency bands (e.g., RF spectrum bands 1-4) and VPMN 210 supported frequency bands (e.g., RF spectrum bands 4-7). By providing RF spectrum band information to HSS 250, more intelligent network service access decisions may be made because HSS 250 may store more granular details regarding UE 205 than the information stored by AAA 245 (e.g., HSS 250 may consider the impact that RF capacity bands have on coverage for a particular network service to which UE 205 is subscribed).

As shown by reference number 535, AAA 245 may provide RF band information and location information to an external server, such as mapping server 255. As an example, AAA 245 may provide, to mapping server 255, RF spectrum band information that identifies UE 205 supported frequency bands (e.g., RF spectrum bands 1-4), VPMN 210 supported frequency bands (e.g., RF spectrum bands 4-7), and/or location information for UE 205. Additionally, or alternatively, mapping server 255 may store location information for other UEs 205 currently roaming on VPMN 210 and/or location information for other UEs 205 previously roaming on VPMN 210 (e.g., information previously received from, for example, AAA 245). Mapping server 255 may use the RF spectrum band information and location information to create frequency band location maps that record which RF spectrum bands are being used for network services in specific geographic locations, as well as information about the quality of service for RF spectrum band use in those locations. By using frequency band location maps to monitor RF spectrum band use in specific geographic locations throughout VPMN 210, more intelligent network service access decisions may be made by permitting or denying access to network services based on positive and/or negative experiences of other UEs 205 that are currently roaming on VPMN 210 and/or that have previously roamed on VPMN 210.

As shown by reference number 540, AAA 245 may permit or deny an IMS PDN connect request for one or more IMS services based on determinations made by AAA 245, HSS 250, and/or mapping server 255. In some implementations, AAA 245 may determine whether to permit or deny access to IMS services by comparing the RF spectrum bands supported by UE 205 to the primary coverage band of VPMN 210 (e.g., UE 205 may support RF spectrum bands 1-4, VPMN 210 may support RF spectrum band 7 as the primary coverage band, and AAA 245 may compare these to determine if a match exists). If UE 205 supports the primary coverage band of VPMN 210 (e.g., if UE 205 supports RF spectrum band 7), then AAA 245 may permit access to IMS services and allow IMS registration. If UE 205 does not support the primary coverage band of VPMN 210 (e.g., if UE 205 does not support RF spectrum band 7), then AAA 245 may deny access to IMS services or perform one or more additional determinations.

In some implementations, AAA 245 and/or HSS 250 may determine whether to permit or deny access to one or more IMS services by comparing RF spectrum bands of UE 205 and VPMN 210 (e.g., by comparing RF spectrum bands 1-4 to RF spectrum bands 4-7) to determine whether a threshold number of RF spectrum bands are supported by both UE 205 and VPMN 210. For example, for an IMS service such as VoLTE, if a threshold number of RF spectrum bands are supported by both UE 205 and VPMN 210, then AAA 245 may permit access to VoLTE and allow IMS registration. As an example, if UE 205 supports RF spectrum band 4, VPMN 210 supports VoLTE using RF spectrum bands 4 and 5, and a threshold is set to an RF spectrum band match of one, then AAA 245 may permit access to VoLTE because UE 205 supports one of the RF spectrum bands used to support VoLTE. However, if the threshold is set to an RF spectrum match of two or 100% (e.g., UE 205 must support both RF spectrum band 4 and RF spectrum band 5 to use VoLTE), then the threshold is not satisfied because UE 205 does not support both of the RF spectrum bands used to support VoLTE. As a result, AAA 245 may deny access to VoLTE. In addition to denying access to VoLTE, AAA 245 and/or HSS 250 may permit or deny an IMS service, such as SMS, by using the same threshold technique discussed above. As an example, if UE 205 supports a threshold number of RF spectrum bands that VPMN 210 uses for SMS, AAA 245 and/or HSS 250 may permit access to SMS.

In some implementations, AAA 245 and/or mapping server 255 may determine whether to permit or deny access to one or more IMS services based on frequency band location maps created by mapping server 255. For example, AAA 245 may permit or deny access to IMS services using frequency band location maps by comparing the matching RF spectrum bands of UE 205 and VPMN 210 to the RF spectrum bands obtained from other UEs 205 currently or previously roaming on VPMN 210.

As an example, AAA 245 may permit or deny access to IMS services by using the frequency band location map to determine whether a threshold number or percentage of other UEs 205 support the matching RF spectrum bands of UE 205 and VPMN 210. For example, AAA 245 and/or mapping server 255 may first determine the matching RF spectrum bands between UE 205 and VPMN 210 (e.g., UE 205 RF spectrum bands 1-4 and VPMN 210 RF spectrum bands 4-7 have matching RF spectrum band 4). Next, AAA 245 and/or mapping server 255 may search the frequency band location map to compare the matching RF spectrum band of UE 205 and VPMN 210 (e.g., RF spectrum band 4) to the RF spectrum bands of other UEs 205 currently or previously roaming on VPMN 210. As an example, if a threshold number of other UEs 205 support the same RF spectrum band as the matching RF spectrum band of UE 205 and VPMN 210 (e.g., if a threshold is set to 85% and 90 out of 100 other UEs 205 support RF spectrum band 4), then AAA 245 and/or mapping server 255 may permit access to the IMS service. However, if a threshold number of other UEs 205 do not support the same RF spectrum band as the matching RF spectrum band of UE 205 and VPMN 210 (e.g., if a threshold is set to 85% and 80 out of 100 other UEs 205 support RF spectrum band 4), then AAA 245 and/or mapping server 255 may deny access to the IMS service.

As shown in FIG. 5B, MME 220 of VPMN 210 may determine whether UE 205 is permitted to access an IMS service. For example, MME 220 may be configured to determine whether a UE 205 roaming on VPMN 210 is permitted to access an IMS service based on an identifier. Additionally, MME 220 may be configured to store, or access a VPMN 210 database that stores, RF spectrum bands supported by VPMN 210. As shown by reference number 545, UE 205 may perform an EPC attach to MME 220 to send information that identifies RF spectrum bands supported by UE 205. For example, UE 205 may send base station 215 an attachment request, and base station 215 may route the request to MME 220.

As shown by reference number 550, MME 220 may authenticate the roaming UE 205 based on the attachment request by requesting authorized EPC services from HSS 250. As a result of the request, HSS 250 may provide MME 220 a list of authorized EPC services (e.g., APNs, quality of service (QoS) per APN, etc.).

As shown by reference number 555, MME 220 may set an identifier to a value that permits or denies access to an IMS service based on whether the primary coverage band of VPMN 210 matches at least one RF spectrum band supported by UE 205. As an example, if the primary coverage band of VPMN 210 matches at least one of the RF spectrum bands of UE 205, MME 220 may set an identifier to a value indicating an acceptance of the IMS service (e.g., identifier_value=1). Alternatively, if the primary coverage band of VPMN 210 does not match at least one of the RF spectrum bands of UE 205, MME 220 may set an identifier to a value indicating a rejection of the IMS services (e.g., identifier_value=1). MME 220 may use the identifier (e.g., identifier_value=1 or identifier_value=0) to permit or deny access to the IMS service.

As indicated above, FIGS. 5A and 5B are provided merely as an example. Other examples are possible and may differ from what was described with regard to FIGS. 5A and 5B.

In this way, service management device 240 allows UE 205 to receive higher quality network services while roaming on VPMN 210. For example, intelligent RF spectrum band reporting allows the HPMN to deny the UE access to network services that lead to a negative user experience (e.g., a poor connection during a VoLTE call), while allowing the UE access to network services that lead to a positive user experience (e.g., a strong connection during a VoLTE call). In addition, service management device 240 conserves network resources by limiting network traffic (e.g., service management device 240 may deny access to VoLTE in poor network conditions, which would reduce overall network traffic and data use).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, of a home public mobile network (HPMN), comprising:
    a memory; and
    one or more processors to:
        receive, by the one or more processors of the device and from a user equipment (UE), roaming on a visiting public mobile network (VPMN), via a base station of the VPMN, a request to access a network service,
        the request including:
            UE radio frequency (RF) band information that identifies a UE supported set of RF spectrum bands, and
            VPMN RF band information that identifies a VPMN supported set of RF spectrum bands;
        determine, by the one or more processors of the device, whether to permit or deny access to the network service based on the UE RF band information and the VPMN RF band information; and
        provide, by the one or more processors of the device, an instruction to permit or deny access to the network service based on determining whether to permit or deny access to the network service,
        access to the network service being permitted based on the UE supported set of RF spectrum bands including a threshold quantity of RF spectrum bands that match the VPMN supported set of RF spectrum bands.

2. The device of claim 1, where the UE RF band information and the VPMN RF band information are included as protocol configuration options identified in the request to access the network service.

3. The device of claim 1, where the one or more processors are further to:
    receive location information associated with the UE,
        the location information including a mobile country code-mobile network code (MCC-MNC) or a tracking area code (TAC); and
    where the one or more processors, when determining whether to permit or deny access to the network service, are further to:
        determine whether to permit or deny access to the network service based on the UE RF band information, the VPMN RF band information, and the location information.

4. The device of claim 1, where the one or more processors, when determining whether to permit or deny access to the network service, are further to: determine to permit access to the network service based on the UE RF band information identifying an RF spectrum band that matches a primary coverage band of the VPMN.

5. The device of claim 1, where the one or more processors, when determining whether to permit or deny access to the network service, are further to: determine whether to permit or deny access to the network service based on the UE RF band information, the VPMN RF band information, location information associated with the UE, and stored information associated with one or more other UEs that have roamed on the VPMN.

6. The device of claim 1, where the network service is a first network service;
    where the one or more processors, when determining whether to permit or deny access to the network service, are further to:
        determine to permit access to the first network service based on the UE RF band information and the VPMN RF band information; and
        determine to deny access to a second network service based on the UE RF band information and the VPMN RF band information; and
    where the one or more processors, when providing the instruction, are to:
        provide a first instruction to permit access to the first network service; and
        provide a second instruction to deny access to the second network service.

7. A non-transitory computer-readable medium storing instructions, the instructions comprising:
    one or more instructions that, when executed by one or more processors of a device of a home public mobile network (HPMN), cause the one or more processors of the device to:
        receive, from a user equipment (UE), roaming on a visiting public mobile network (VPMN), via a base station of the VPMN, a request to access a network service associated with the VPMN,
        the request including:
            UE radio frequency (RF) band information that identifies a UE supported set of RF spectrum bands, and
            VPMN RF band information that identifies a VPMN supported set of RF spectrum bands;
        determine whether to permit or deny access to the network service based on the UE supported set of RF spectrum bands and the VPMN supported set of RF spectrum bands; and
        provide an instruction, to the UE, to permit or deny access to the network service based on determining whether to permit or deny access to the network service,
        access to the network service being permitted based on a threshold quantity of the UE supported set of RF spectrum bands matching a threshold quantity of the VPMN supported set of RF spectrum bands.

8. The non-transitory computer-readable medium of claim 7, where the one or more instructions, when executed by the one or more processors, further cause the one or more processors to:
    receive, in association with the request, location information associated with the UE, the location information including a MCC-MNC or a TAC; and
    where the one or more instructions, that cause the one or more processors to determine whether to permit or deny access to the network service, further cause the one or more processors to:

determine whether to permit or deny access to the network service based on the UE supported set of RF spectrum bands, the VPMN supported set of RF spectrum bands, and the location information.

9. The non-transitory computer-readable medium of claim 7, where the one or more instructions, that cause the one or more processors to determine whether to permit or deny access to the network service, further cause the one or more processors to: determine to permit access to the network service based on the UE supported set of RF spectrum bands including an RF spectrum band that matches a primary coverage band of the VPMN.

10. The non-transitory computer-readable medium of claim 7, where the one or more instructions, that cause the one or more processors to determine whether to permit or deny access to the network service, further cause the one or more processors to: determine whether to permit or deny access to the network service based on the UE supported set of RF spectrum bands, the VPMN supported set of RF spectrum bands, location information associated with the UE, and stored information associated with one or more other UEs that have roamed on the VPMN.

11. The non-transitory computer-readable medium of claim 7, where the network service is a first network service;
where the one or more instructions, that cause the one or more processors to determine whether to permit or deny access to the network service, further cause the one or more processors to:
determine to permit access to the first network service based on the UE supported set of RF spectrum bands and the VPMN supported set of RF spectrum bands; and
determine to deny access to a second network service based on the UE supported set of RF spectrum bands and the VPMN supported set of RF spectrum bands; and
where the one or more instructions, that cause the one or more processors to provide the instruction to permit or deny access to the network service, cause the one or more processors to:
provide a first instruction to permit access to the first network service; and
provide a second instruction to deny access to the second network service.

12. A method, comprising:
receiving, by a device from a user equipment (UE), roaming on a visiting public mobile network (VPMN), via a base station of the VPMN, a request to access a network service,
the device being associated with a home public mobile network (HPMN), and
the request including:
UE radio frequency (RF) band information that identifies a UE supported set of RF spectrum bands, and
VPMN RF band information that identifies a VPMN supported set of RF spectrum bands;
determining, by the device, whether to permit or deny access to the network service based on the UE RF band information and the VPMN RF band information; and
providing, by the device, an instruction to permit or deny access to the network service based on determining whether to permit or deny access to the network service,
access to the network service being permitted based on the UE supported set of RF spectrum bands including a threshold quantity of RF spectrum bands that match the VPMN supported set of RF spectrum bands.

13. The method of claim 12, further comprising:
receiving, in association with the request, location information associated with the UE, the location information including a MCC-MNC or a TAC; and
where determining whether to permit or deny access to the network service further comprises:
determining whether to permit or deny access to the network service based on the UE RF band information, the VPMN RF band information, and the location information.

14. The method of claim 12, where determining whether to permit or deny access to the network service further comprises:
determining to permit access to the network service based on a primary coverage band of the VPMN matching an RF spectrum band identified in the UE RF band information.

15. The method of claim 12, where determining whether to permit or deny access to the network service further comprises:
determining whether to permit or deny access to the network service based on the UE RF band information associated with the UE, the VPMN RF band information associated with the VPMN, location information associated with the UE, and stored information associated with one or more other UEs that have roamed on the VPMN.

16. The method of claim 12, where the network service is a first network service;
where determining whether to permit or deny access to the network service further comprises:
determining to permit access to the first network service based on the UE RF band information and the VPMN RF band information; and
determining to deny access to a second network service based on the UE RF band information and the VPMN RF band information; and
where providing the instruction to permit or deny access to the network service comprises:
providing a first instruction to permit access to the first network service; and
providing a second instruction to deny access to the second network service.

17. The non-transitory computer-readable medium of claim 7, where the one or more instructions, when executed by the one or more processors, further cause the one or more processors to:
generate, based on the UE RF band information and the VPMN RF band information, one or more frequency band location maps,
the frequency band location maps including:
one or more RF spectrum bands being used in one or more particular geographic locations, and
information associated with a quality of service associated with the one or more RF spectrum bands; and
where the one or more instructions, that cause the one or more processors to determine whether to permit or deny access to the network service, further cause the one or more processors to:
determine whether to permit or deny access to the network service based on the one or more frequency band location maps.

18. The device of claim 1, where the threshold quantity is a threshold percentage.

19. The non-transitory computer-readable medium of claim 7, where access to the network service is further permitted based on a threshold percentage of the UE supported set of RF spectrum bands matching a threshold percentage of the VPMN supported set of RF spectrum bands.

20. The method of claim 12, where access to the network service is further permitted based on the UE supported set of RF spectrum bands matching a threshold percentage of the VPMN supported set of RF spectrum bands.

* * * * *